United States Patent
Lukacs et al.

(10) Patent No.: US 9,323,931 B2
(45) Date of Patent: Apr. 26, 2016

(54) COMPLEX SCORING FOR MALWARE DETECTION

(71) Applicant: Bitdefender IPR Management Ltd., Nicosia (CY)

(72) Inventors: Sandor Lukacs, Floresti (RO); Raul V. Tosa, Cluj-Napoca (RO); Paul Boca, Bistrita (RO); Gheorghe Hajmasan, Lunca Muresului (RO); Andrei V. Lutas, Satu Mare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 86 days.

(21) Appl. No.: 14/046,728

(22) Filed: Oct. 4, 2013

(65) Prior Publication Data

US 2015/0101049 A1  Apr. 9, 2015

(51) Int. Cl.
*H04L 29/06* (2006.01)
*G06F 21/56* (2013.01)

(52) U.S. Cl.
CPC .............. *G06F 21/566* (2013.01); *H04L 63/14* (2013.01)

(58) Field of Classification Search
CPC .................................................... G06F 21/566
USPC ....................................................... 726/22–25
See application file for complete search history.

(56) References Cited

U.S. PATENT DOCUMENTS

| | | | |
|---|---|---|---|
| 7,620,992 B2 | 11/2009 | Monastyrsky et al. | |
| 7,748,039 B2 | 6/2010 | Alagna et al. | |
| 7,870,612 B2 | 1/2011 | Liu | |
| 7,908,660 B2 | 3/2011 | Bahl | |
| 7,930,751 B2 | 4/2011 | Alagna et al. | |
| 8,037,536 B2 | 10/2011 | Treadwell et al. | |
| 8,578,345 B1 * | 11/2013 | Kennedy et al. | 717/132 |
| 8,615,805 B1 * | 12/2013 | Obrecht et al. | 726/24 |

(Continued)

FOREIGN PATENT DOCUMENTS

WO    2010023557 A2    3/2010

OTHER PUBLICATIONS

Bitdefender, "BitDefender Active Virus Control: Pro Active Protection Against New and Emerging Threats," whitepaper, p. 1-10, Bitdefender Antivirus Software, Bucharest, Romania; Jan. 2010.

(Continued)

*Primary Examiner* — Izunna Okeke
*Assistant Examiner* — Hee Song
(74) *Attorney, Agent, or Firm* — Law Office of Andrei D Popovici, PC

(57) ABSTRACT

Described systems and methods allow protecting a computer system from malware such as viruses, Trojans, and spyware. For each of a plurality of executable entities (such as processes and threads executing on the computer system), a scoring engine records a plurality of evaluation scores, each score determined according to a distinct evaluation criterion. Every time an entity satisfies an evaluation criterion (e.g, performs an action), the respective score of the entity is updated. Updating a score of an entity may trigger score updates of entities related to the respective entity, even when the related entities are terminated, i.e., no longer active. Related entities include, among others, a parent of the respective entity, and/or an entity injecting code into the respective entity. The scoring engine determines whether an entity is malicious according to the plurality of evaluation scores of the respective entity.

15 Claims, 10 Drawing Sheets

(56) References Cited

U.S. PATENT DOCUMENTS

| | | |
|---|---|---|
| 2004/0230835 A1 | 11/2004 | Goldfeder et al. |
| 2010/0293615 A1 | 11/2010 | Ye |
| 2012/0311708 A1 | 12/2012 | Agarwal et al. |
| 2012/0324575 A1 | 12/2012 | Choi et al. |
| 2013/0145463 A1* | 6/2013 | Ghosh et al. .................... 726/22 |
| 2015/0074806 A1* | 3/2015 | Roundy et al. .................. 726/23 |

OTHER PUBLICATIONS

European Patent Office, International Search Report and Written Opinion of the International Searching Authority, Mailed Feb. 19, 2015 for PCT International Application No. PCT/RO2014/000027, Filed Sep. 25, 2014.

* cited by examiner

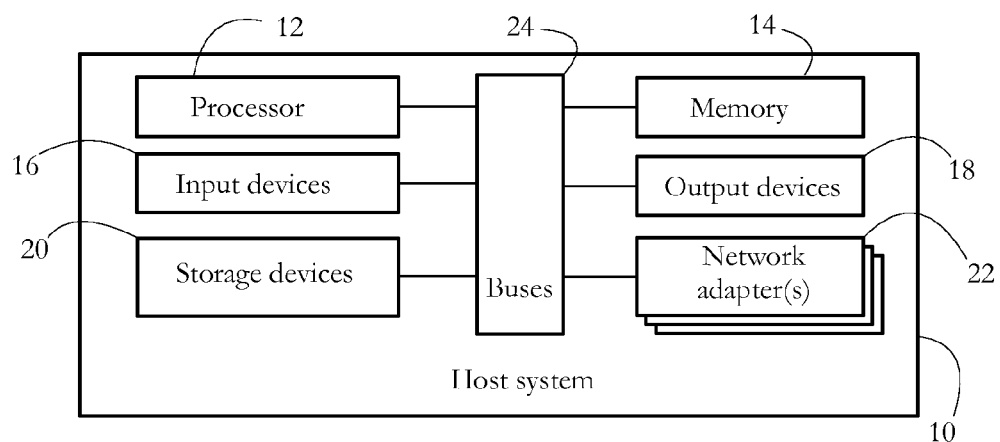
FIG. 1
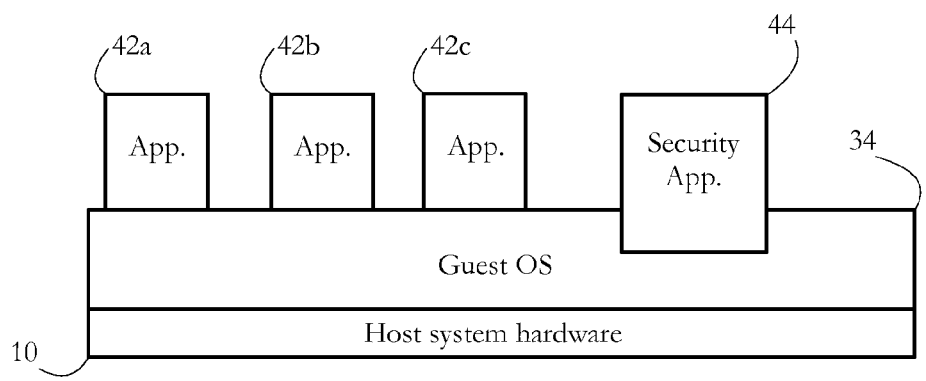
FIG. 2-A

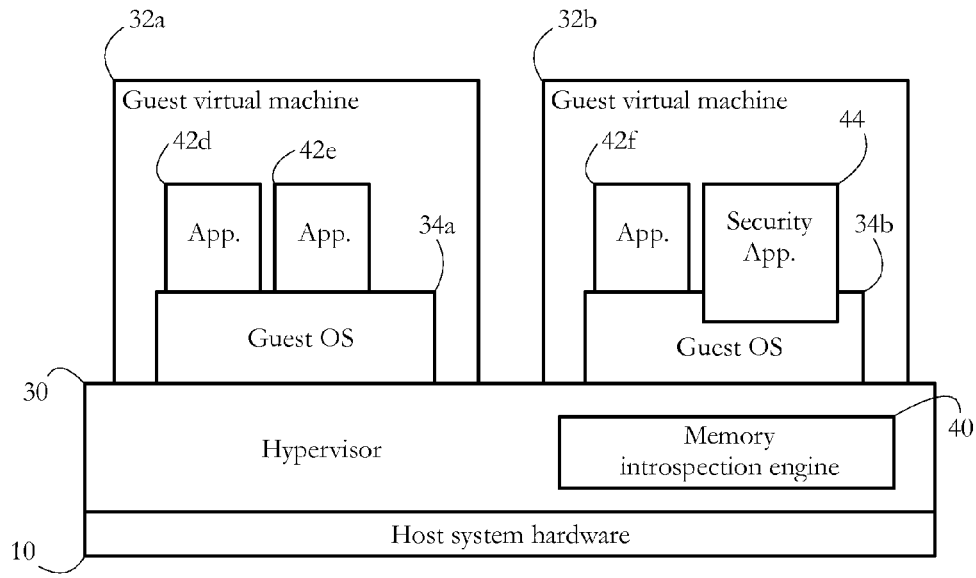
FIG. 2-B
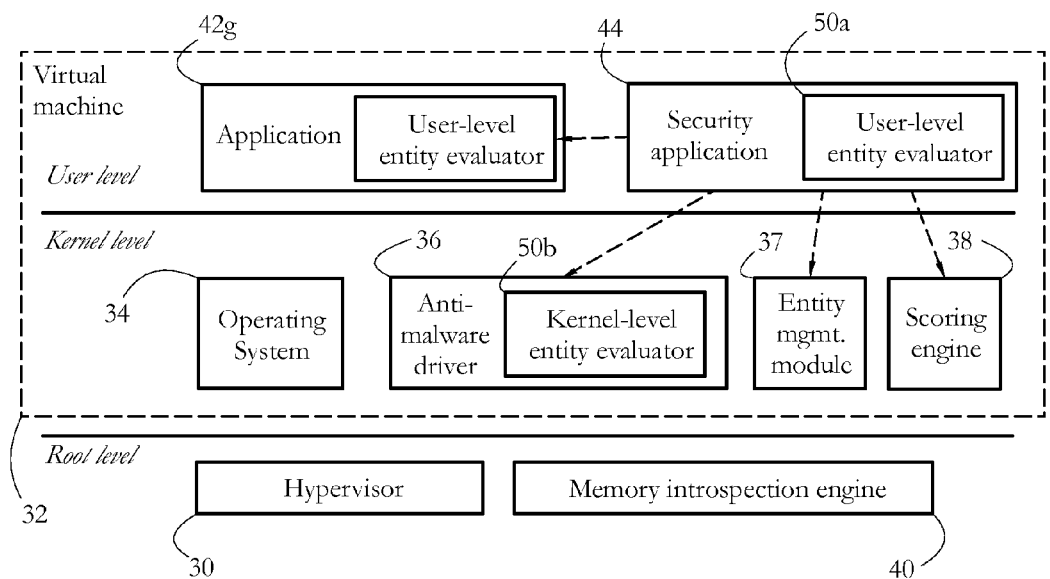
FIG. 3

COMPLEX SCORING FOR MALWARE DETECTION

BACKGROUND

The invention relates to systems and methods for protecting computer systems from malware.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others.

Security software may be used to detect malware infecting a user's computer system, and additionally to remove or stop the execution of such malware. Several malware-detection techniques are known in the art. Some rely on matching a fragment of code of the malware agent to a library of malware-indicative signatures. Other conventional methods detect a set of malware-indicative behaviors of the malware agent.

To evade detection and/or undermine the operation of security software, some malware agents employ obfuscation techniques, such as encrypting their code, or using slightly different code versions on each infected computer system (polymorphism). Other exemplary detection avoidance methods divide malicious activities into several actions, each action performed by a separate agent, possibly with a time delay. In other examples, malware may try to actively attack and disable the security software, for instance by using privilege escalation and/or by overwriting the security software's code.

To keep up with a rapidly changing set of malware threats, there is a strong interest in developing robust and scalable anti-malware solutions.

SUMMARY

According to one aspect, a host system comprises at least one processor configured to execute an entity management module, an entity evaluator, and a scoring engine. The entity management module is configured to manage a collection of evaluated software entities, wherein managing the collection comprises: identifying a set of descendant entities of a first entity of the collection; determining whether the first entity is terminated; in response, when the first entity is terminated, determining whether all members of the set of descendant entities are terminated; and in response, when all members of the set of descendant entities are terminated, removing the first entity from the collection. The entity evaluator is configured to: evaluate the first entity according to an evaluation criterion; and in response, when the first entity satisfies the evaluation criterion, transmit an evaluation indicator to the scoring engine. The scoring engine is configured to: record a first score determined for the first entity and a second score determined for a second entity of the collection, the first and second scores determined according to the evaluation criterion; in response to recording the first and second scores, and in response to receiving the evaluation indicator, update the second score according to the evaluation indicator; and in response, determine whether the second entity is malicious according to the updated second score.

According to another aspect, a non-transitory computer-readable medium stores instructions, which, when executed, configure at least one processor of a host system to manage a collection of evaluated software entities, wherein managing the collection comprises: identifying a set of descendant entities of a first entity of the collection; determining whether the first entity is terminated; in response, when the first entity is terminated, determining whether all members of the set of descendant entities are terminated; and in response, when all members of the set of descendant entities are terminated, removing the selected entity from the collection. The instructions further configure the at least one processor to record a first score determined for the first entity and a second score determined for a second entity of the collection, the first and second scores determined according to an evaluation criterion. The instructions further configure the at least one processor, in response to recording the first and second scores, to evaluate the first entity according to the evaluation criterion. The instructions further configure the at least one processor, in response to evaluating the first entity, when the first entity satisfies the evaluation criterion, to update the second score, and in response to updating the second score, to determine whether the second entity is malicious according to the updated second score.

According to another aspect, a host system comprises at least one processor configured to execute an entity evaluator and a scoring engine. The entity evaluator is configured to: evaluate the first software entity according to an evaluation criterion, the first software entity executing on the client system, and in response, when the first software entity satisfies the evaluation criterion, transmit an evaluation indicator to the scoring engine. The scoring engine is configured, in response to receiving the evaluation indicator, to update a score according to the evaluation indicator, wherein the score is determined for a second software entity previously executing on the host system, the second software entity terminated at the time of updating the score. The scoring engine is further configured, in response to updating the second score, to determine whether the second software entity is malicious according to the updated second score.

According to another aspect, a method comprises employing at least one processor of a host system to determine whether a first software entity executing on the host system satisfies an evaluation criterion. The method further comprises, when the first software entity satisfies the evaluation criterion, employing the at least one processor to update a score determined for a second software entity previously executing on the host system, the second software entity terminated at the time of updating the score, the score determined according to the evaluation criterion. The method further comprises, in response to updating the second score, employing the at least one processor to determine whether the second software entity is malicious according to the updated second score.

BRIEF DESCRIPTION OF THE DRAWINGS

The foregoing aspects and advantages of the present invention will become better understood upon reading the following detailed description and upon reference to the drawings where:

FIG. 1 shows an exemplary hardware configuration of a host computer system protected from malware according to some embodiments of the present invention.

FIG. 2-A shows an exemplary set of software objects including a security application executing on a host system according to some embodiments of the present invention.

FIG. 2-B shows an exemplary set of software objects, including a security application executing within a virtual machine, in a host system configured to support virtualization.

FIG. 3 illustrates an exemplary hierarchy of software objects executing on the host system at various processor privilege levels, including a set of anti-malware objects according to some embodiments of the present invention.

DETAILED DESCRIPTION OF PREFERRED EMBODIMENTS

Figure 4:
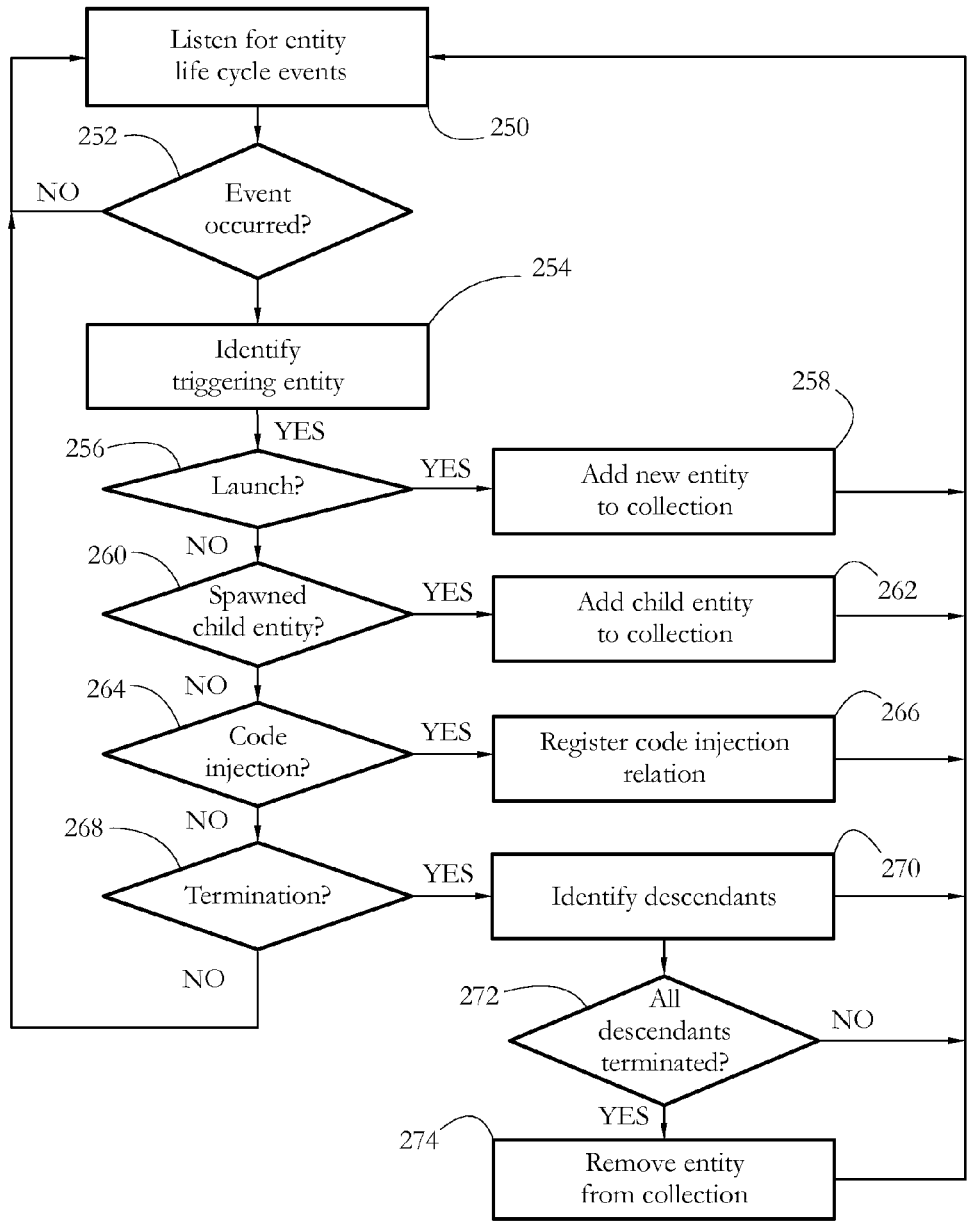
FIG. 4 shows an exemplary sequence of steps performed by the entity management module of FIG. 3 according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a process represents an instance of a computer program, wherein a computer program is a sequence of instructions determining a computer system to perform a specified task. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

FIG. 1 shows an exemplary hardware configuration of a host system 10 performing anti-malware operations according to some embodiments of the present invention. Host system 10 may represent a corporate computing device such as an enterprise server, or an end-user device such as a personal computer or a smartphone, among others. Other host systems include entertainment devices such as TVs and game consoles, or any other device having a memory and a processor supporting virtualization, and requiring malware protection. FIG. 1 shows a computer system for illustrative purposes; other client devices such as mobile telephones or tablets may have a different configuration. In some embodiments, system 10 comprises a set of physical devices, including a processor 12, a memory unit 14, a set of input devices 16, a set of output devices 18, a set of storage devices 20, and a set of network adapters 22, all connected by a set of buses 24.

In some embodiments, processor 12 comprises a physical device (e.g. multi-core integrated circuit) configured to execute computational and/or logical operations with a set of signals and/or data. In some embodiments, such logical operations are delivered to processor 12 in the form of a sequence of processor instructions (e.g. machine code or other type of software). Memory unit 14 may comprise volatile computer-readable media (e.g. RAM) storing data/signals accessed or generated by processor 12 in the course of carrying out instructions. Input devices 16 may include computer keyboards, mice, and microphones, among others, including the respective hardware interfaces and/or adapters allowing a user to introduce data and/or instructions into system 10. Output devices 18 may include display devices such as monitors and speakers among others, as well as hardware interfaces/adapters such as graphic cards, allowing system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of software instructions and/or data. Exemplary storage devices 20 include magnetic and optical disks and flash memory devices, as well as removable media such as CD and/or DVD disks and drives. The set of network adapters 22 enables system 10 to connect to a computer network and/or to other devices/computer systems. Buses 24 collectively represent the plurality of system, peripheral, and chipset buses, and/or all other circuitry enabling the inter-communication of devices 12-22 of host system 10. For example, buses 24 may comprise the northbridge connecting processor 12 to memory 14, and/or the southbridge connecting processor 12 to devices 16-22, among others.

FIG. 2-A shows an exemplary set of software objects executing on host system 10 in a configuration, which does not employ hardware virtualization. In some embodiments, a guest operating system (OS) 34 comprises software that provides an interface to the hardware of host system 10, and acts as a host for a set of software applications 42a-c and 44. OS 34 may comprise any widely available operating system such as Windows®, MacOS®, Linux®, iOS®, or Android™, among others. Applications 42a-c may include word processing, image processing, database, browser, and electronic communication applications, among others.

FIG. 2-B shows an exemplary set of software objects executing on host system 10 in an embodiment using hardware virtualization. A set of guest virtual machines 32a-b are exposed by a hypervisor 30. Virtual machines (VM) are commonly known in the art as software emulations of actual physical machines/computer systems, each capable of running its own operating system and software independently of other VMs. Hypervisor 30 comprises software allowing the multiplexing (sharing) by multiple virtual machines of hardware resources of host system 10, such as processor operations, memory, storage, input/output, and networking devices. In some embodiments, hypervisor 30 enables multiple virtual machines and/or operating systems (OS) to run concurrently on host system 10, with various degrees of isolation. To enable such configurations, software forming part of hypervisor 30 may create a plurality of virtualized, i.e., software-emulated devices, each virtualized device emulating a physical hardware device of system 10, such as processor 12 and memory 14, among others. Hypervisor 30 may further assign a set of virtual devices to each VM operating on host system 10. Thus, each VM 32a-b operates as if it possesses its own set of physical devices, i.e., as a more or less complete computer system. Creation and assignment of virtual devices to a virtual machine are commonly known in the art as exposing the respective VM. Examples of popular hypervisors include the VMware vSphere™ from VMware Inc. and the open-source Xen hypervisor, among others.

In some embodiments, hypervisor 30 includes a memory introspection engine 40, configured to perform anti-malware operations as described further below. Engine 40 may be incorporated into hypervisor 30, or may be delivered as a software component distinct and independent from hypervisor 30, but executing at substantially similar processor privilege level as hypervisor 30. A single engine 40 may be configured to malware-protect multiple VMs executing on host system 10.

While FIG. 2-B shows just two VMs 32a-b for simplicity, host system 10 may operate a large number, e.g. hundreds, of VMs concurrently, and the number of such VMs may change during the operation of host system 10. In some embodiments, each VM 32a-b executes a guest operating system 34a-b and/or a set of software applications 42d-e, and 42f, respectively, concurrently and independently of other VMs running on host system 10. Each OS 34a-b comprises software that provides an interface to the (virtualized) hardware of the respective VM 32a-b, and acts as a host for computing applications executing on the respective OS.

In some embodiments, a security application 44 is configured to perform anti-malware operations as detailed below, to protect host system 10 from malware. In the example of FIG. 2-B, an instance of application 44 may execute on each VM 32a-b, each such instance configured to protect the respective virtual machine. Security application 44 may be a standalone program, or may form part of a software suite comprising, among others, anti-malware, anti-spam, and anti-spyware components.

FIG. 3 illustrates a hierarchy of software objects executing on host system 10 according to some embodiments of the present invention. FIG. 3 shows an exemplary embodiment configured to execute in a virtualization environment; it may be clear to a person skilled in the art that the illustrated embodiment may be modified to execute directly on host system 10 instead of within VM 32. FIG. 3 is represented from the perspective of processor privilege levels, also known in the art as layers or protection rings. In some embodiments, each such layer or protection ring is characterized by a set of instructions, which a software object executing at the respective processor privilege level is allowed to execute. When a software object attempts to execute an instruction, which is not allowed within the respective privilege level, the attempt may trigger a processor event, such as an exception, a fault, or a virtual machine exit event. In some embodiments, switching between privilege levels may be achieved via a set of dedicated instructions. Such exemplary instructions include SYSCALL/SYSENTER, which switch from user level to kernel level, SYSRET/SYSEXIT, which switch from kernel level to user level, VMCALL, which switches from either user or kernel level to root level, and VMRESUME, which switches from root level to either kernel or user level.

Most components of operating system 34 execute at a processor privilege level known in the art as kernel level, or kernel mode (e.g., ring 0 on Intel platforms). An application 42g executes at lesser processor privilege than OS 34 (e.g., ring 3, or user mode). In an embodiment supporting virtualization, hypervisor 30 takes control of processor 12 at the most privileged level, also known root level or root mode (e.g., ring −1 or VMXroot on Intel® platforms), exposing virtual machine 32 to OS 34 and other software objects such as application 42g.

In some embodiments, parts of security application 44 may execute at user-level processor privilege, i.e., same level as application 42g. For instance, such parts may comprise a graphical user interface informing a user of any malware or security threats detected on the respective VM, and receiving input from the user indicating, e.g., a desired configuration option for application 44. Another example of a component executing at user level is a user-level entity evaluator 50a, operating as detailed below. In some embodiments, a part of user-level entity evaluator 50a may operate within security application 44, while another part (such as a hooking module) may operate within an evaluated application, such as application 42g. Other parts of application 44 may execute at kernel privilege level. For instance, application 44 may install an anti-malware driver 36, an entity management module 37, and a scoring engine 38, all operating in kernel mode. Driver 36 provides functionality to anti-malware application 44, e.g. to scan memory for malware signatures and/or to detect malware-indicative behavior of processes and/or other software objects executing on OS 34. In some embodiments, anti-malware driver 36 includes a kernel-level entity evaluator 50b, operating as detailed below.

In some embodiments, entity management module 37 manages a collection of software entities executing within host system 10 (or VM 32). In some embodiments, the collection comprises all entities being evaluated for malware by entity evaluation modules such as 55a-b. To manage the collection, module 37 may add and/or remove entities from the collection in response to detecting the occurrence of life-cycle events, such as entity launch and/or termination events, as shown in mode detail below. Module 37 may further determine inter-entity relationships, such as determine child entities (e.g., child processes) of a parent entity, and/or determine whether a selected entity has injected a software object, such as a library, into another entity, or whether the selected entity is the target of injection by another software entity. A child entity is an executable entity created by another executable entity called the parent entity, the child entity executing independently from the parent entity. Exemplary child entities are child processes, for instance created via the CreateProcess function of the Windows® OS, or via the fork mechanism in Linux®. Code injection is a generic term used in the art to indicate a family of methods of introducing a sequence of code, such as a dynamic-link library (DLL), into the memory space of an existing process, to alter the original functionality of the respective process. To perform tasks such as detecting the launch of a process and/or detecting code injection, module 37 may employ any method known in the art, such as calling or hooking certain OS functions. For instance, in a system running a Windows® OS, module 37 may register a PsSetCreateProcessNotifyRoutine callback to detect the launch of a new process, and/or hook the CreateRemoteThread function to detect execution of injected code.

FIG. 4 shows an exemplary sequence of steps performed by entity management module 37 according to some embodiments of the present invention. In a sequence of steps 250-252, module 37 intercepts an entity life-cycle event, using, for instance, the methods described above. When such an event has occurred, a step 254 identifies the entity triggering the respective event. Step 258 may include determining a unique entity identification indicator (EID) of the respective entity; such an indicator may be used in scoring the respective entity, as shown further below. A step 256 determines whether the event comprises a launch of a new entity (e.g., a new process), and when no, module 37 advances to a step 260. When the event comprises a launch, in a step 258, module 37 may add the triggering entity to the collection of evaluated entities. Step 260 comprises determining whether the event comprises a parent entity spawning a child entity, and when no, module 37 may advance to step 264. When yes, in a step 262, module 37 may add the respective child entity to the collection of evaluated entities. Step 262 may further include determining an EID of the child entity, and registering a relation between the triggering entity and the child entity as a filiation (parent-child) relation.

In some embodiments, step 264 determines whether the event comprises an injection of code, and when no, module 37 may advance to a step 268. When yes, module 37 may identify a source entity and a target entity of the code injection, wherein the source entity injects code into the target entity. In a step 266, module 37 may register a relation of the code-injection type between the source entity and the target entity.

In step 268, entity management module 37 determines whether the event comprises the termination of the triggering entity, and when no, module 37 returns to step 250. In some embodiments, an entity is considered terminated when all components of the respective entity have finished execution. For instance, a process is terminated when all the threads of the respective process have finished execution. When the event comprised the termination of the triggering entity, in a step 270, module 37 may determine a set of descendant entities of the triggering entity. In some embodiments, descendant entities of the triggering entity include children entities of the respective entity, as well as children entities of the children entities, over multiple generations. In some embodiments, descendant entities may include target entities comprising code injected by the triggering entity, as well as entities targeted by the targeted entities, recursively. In a step 272, module 37 may determine whether all entities of the set of descendant entities are terminated, and when no, execution returns to step 250. When all descendants are terminated, in a step 274, entity management module 37 may remove the triggering entity from the collection of evaluated entities.

In some embodiments, scoring engine 38 is configured to receive data from a plurality of entity evaluator modules, such as evaluators 50a-b, the data determined for an evaluated software entity, and to determine whether the respective entity is malicious according to the respective data. In some embodiments, software entities analyzed by scoring engine 38 include, among others, executable objects such as processes and execution threads. A process is an instance of a computer program, such as an application or a part of an operating system, and is characterized by having at least an execution thread and a section of virtual memory assigned to it by the operating system, the respective section comprising executable code. In some embodiments, evaluated software entities may vary substantially in scope and complexity, for instance from individual threads, to individual applications, to whole instances of operating systems and/or virtual machines.

Figure 5:
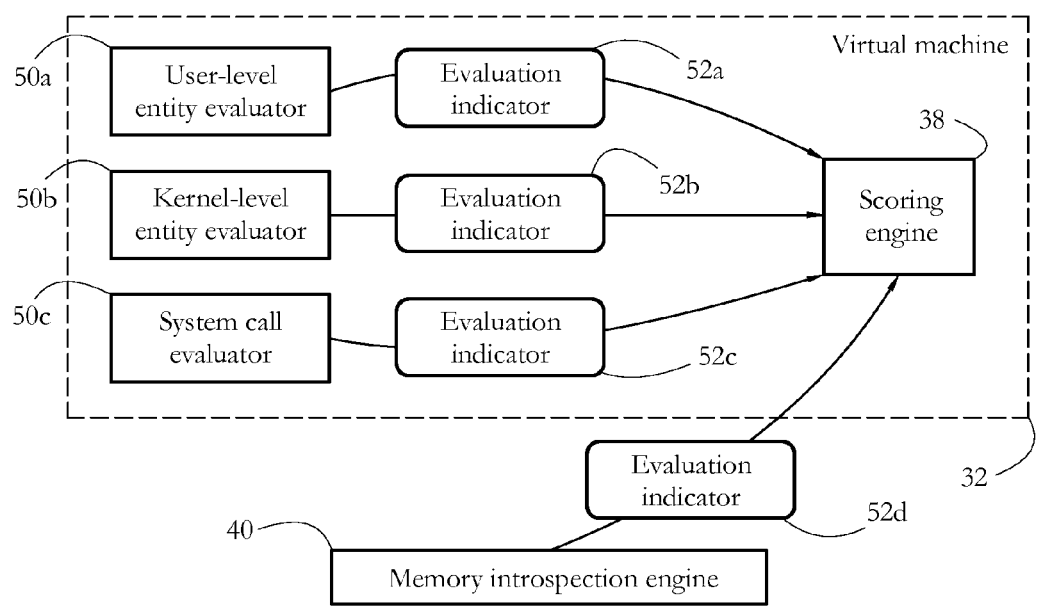
FIG. 5 shows an exemplary scoring engine receiving a plurality of entity evaluation indicators determined for a software entity by a plurality of entity evaluator modules, according to some embodiments of the present invention.

FIG. 5 shows an exemplary scoring engine 38 receiving a plurality of evaluation indicators 52a-d, each indicator 52a-d determined by an entity evaluator. In FIG. 5, such evaluators include user-level entity evaluator 50a, kernel-level entity evaluator 50b, and a system call evaluator 50c, among others. Each such evaluator module may execute independently of other evaluators, and each may determine a plurality of distinct entity evaluation indicators of the evaluated software entity. In systems implementing hardware virtualization, some evaluation indicators, such as indicators 52a-c in FIG. 5, are determined by components executing within VM 32, while other evaluation indicators, such as 52d, are determined by components executing outside VM 32 (for instance, by memory introspection engine 40). In some embodiments, each evaluation indicator 52a-d comprises an entity identification indicator, allowing engine 38 to uniquely associate the respective evaluation indicator to the software entity for which it was determined.

Some evaluation indicators may be malware-indicative, i.e., may indicate that the evaluated entity is malicious. Some evaluation indicators may not be malware-indicative themselves, but may indicate maliciousness when combined with other evaluation indicators. Each evaluation indicator 52a-d may be determined according to a distinct method and/or criterion. Exemplary evaluation criteria include behavioral criteria, such as determining whether the evaluated entity performs a certain action, such as writing to a disk file, editing a system register key of VM 32, or writing to a memory page belonging to a protected software object. Another exemplary criterion may include determining whether a section of memory belonging to the evaluated entity contains a malware-indicative signature.

Figure 6:
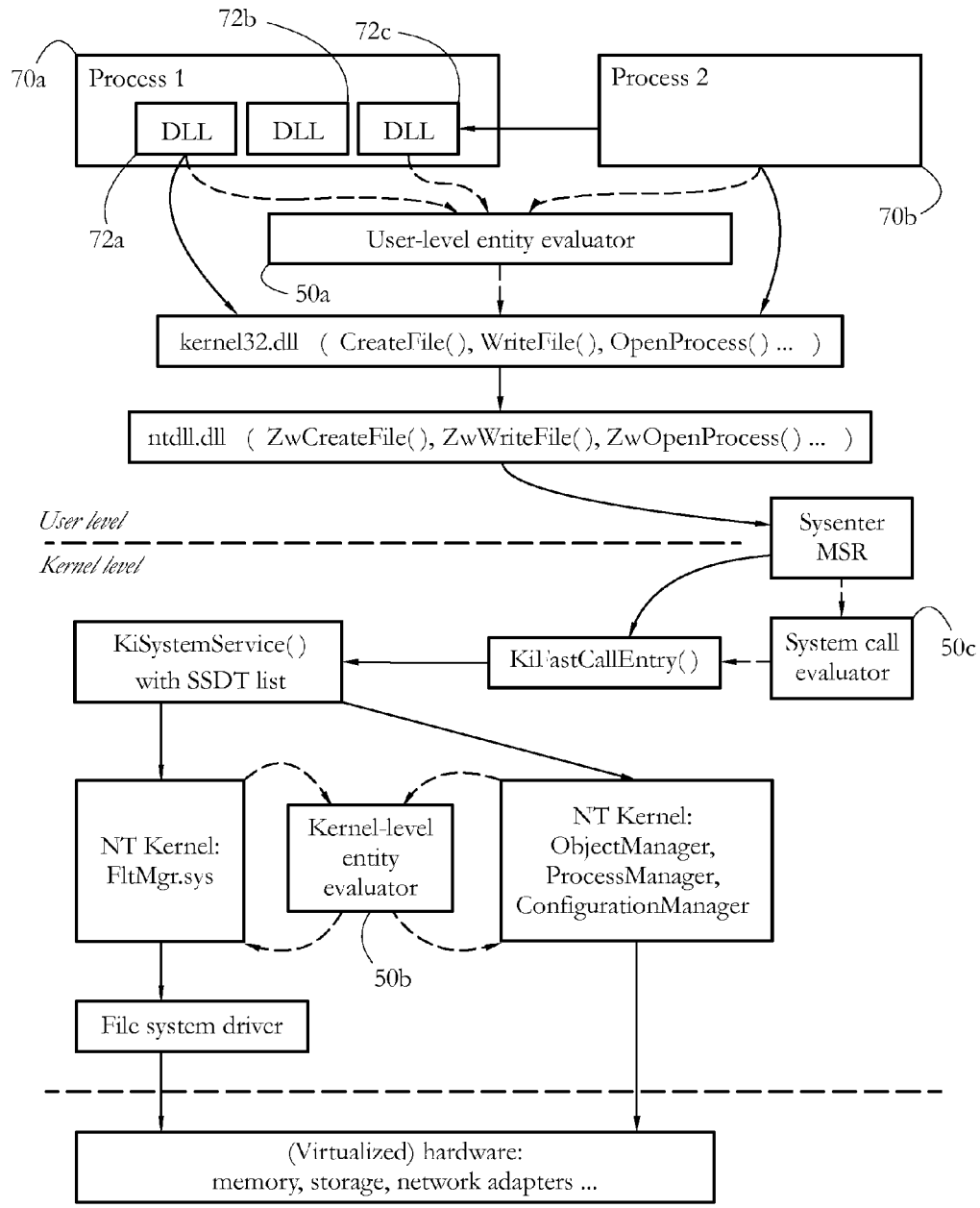
FIG. 6 illustrates an exemplary execution flow of a set of processes in a Windows® environment. Solid arrows indicate an exemplary execution flow in the absence of an anti-malware system. Dashed arrows indicate modifications to the execution flow, the modifications introduced by a plurality of entity evaluators operating according to some embodiments of the present invention.

To illustrate the operation of entity evaluators 50a-c, FIG. 6 shows an exemplary execution flow of a set of software entities 70a-b according to some embodiments of the present invention. For simplicity, the chosen entities 70a-b are processes executing in an instance of a Windows® OS; similar diagrams may be rendered for other operating systems such as Linux, for instance. Solid arrows represent the execution flow in the absence of entity evaluators (e.g., in the absence of security application 44). Dashed arrows represent modifications to the flow due to the presence of entity evaluators 50a-c executing according to some embodiments of the present invention.

Process 70a loads a plurality of dynamic-linked libraries (DLLs) 72a-c; in the example of FIG. 6, DLL 72c is injected into process 70a by (possibly malicious) process 70b. When process 70a (or one of its loaded DLLs) executes an instruction calling for some system functionality, e.g. to write something to a disk file, or to edit a registry key, the respective instruction calls a user-mode API such as KERNEL32.DLL or NTDLL.DLL. In the example of FIG. 6, the respective user-mode API call is intercepted and analyzed by user-level behavioral filter 50a. Such interceptions may be achieved by a method such as DLL injection or hooking, among others. Hooking is a generic term used in the art for a method of intercepting function calls, or messages, or events passed between software components. One exemplary hooking method comprises altering the entry point of a target function, by inserting an instruction redirecting execution to a second function. Following such hooking, the second function may be executed instead, or before, the target function. In the example of FIG. 6, anti-malware driver 36 may hook into certain functions of KERNEL32.DLL or NTDLL.DLL, to instruct the respective functions to redirect execution to filter 50a. Thus, filter 50a may detect that process 70a is attempting to perform a certain behavior, identified according to the hooked function. When filter 50a detects such behavior, filter 50 may formulate evaluation indicator 52a and transmit indicator 52a to scoring engine 38 (see e.g., FIG. 5).

In a typical flow of execution, the user-mode API function called by entity 70a may request service from the operating system's kernel. In some embodiments, such operations are carried out by issuing a system call, such as SYSCALL and SYSENTER on x86 platforms. In the example of FIG. 6, such system calls are intercepted by system call evaluator 50c. In some embodiments, such interception comprises, for instance, modifying a system call handler routine by changing a value stored in a model-specific register (MSR) of processor 12, which effectively redirects execution to filter 50c. Such techniques are known in the art as MSR hooking, and may allow system call evaluator 50c to detect that the evaluated process is attempting to perform certain system calls. When such system calls are intercepted, system call filter 50c may formulate entity evaluation indicator 52c and transmit indicator 52c to scoring engine 38.

Following the system call, control of the processor is typically turned over to the kernel of OS 34. In some embodiments, kernel-level entity evaluator 50b is configured to intercept certain operations of the OS kernel, and therefore determine that the evaluated process is attempting to perform certain operations, which may be malicious. To intercept such operations, some embodiments may employ a set of filtering mechanisms built into and exposed by OS 34. For example, in a Windows OS, FltRegisterFilter may be used to intercept operations like creating, opening, writing to, and deleting a file. In another example, evaluator 50b may use ObRegisterCallback to intercept create or duplicate object-handle operations, or PsSetCreateProcessNotifyRoutine to intercept the creation of new processes. In yet another example, Windows registry operations such as creating and setting registry keys/values may be intercepted using CmRegisterCallbackEx. Similar filtering mechanisms are known in the art for other operating systems such as Linux®. When kernel-mode entity evaluator 50b intercepts such operations, evaluator 50b may formulate entity evaluation indicator 52b and transmit indicator 52b to scoring engine 38.

To transmit data, such as entity evaluation indicators 52a-c, from evaluators 50a-c to scoring engine 38, a person skilled in the art may employ any inter-process communication method. For instance, to communicate between user-mode and kernel-mode components, evaluators 50a-c and engine 38 may be configured to use a shared section of memory. When data exchange is needed between components executing within VM 32, and components executing outside the respective VM, such communication may be carried out using any method known in the art of virtualization. For instance, to transmit evaluation indicator 52d from memory introspection engine 40 to scoring engine 38, some embodiments use an interrupt injection mechanism to signal to engine 38 that data is being transmitted from outside the respective VM. The actual data may be transferred, for instance, through the shared memory section described above.

Figure 7:
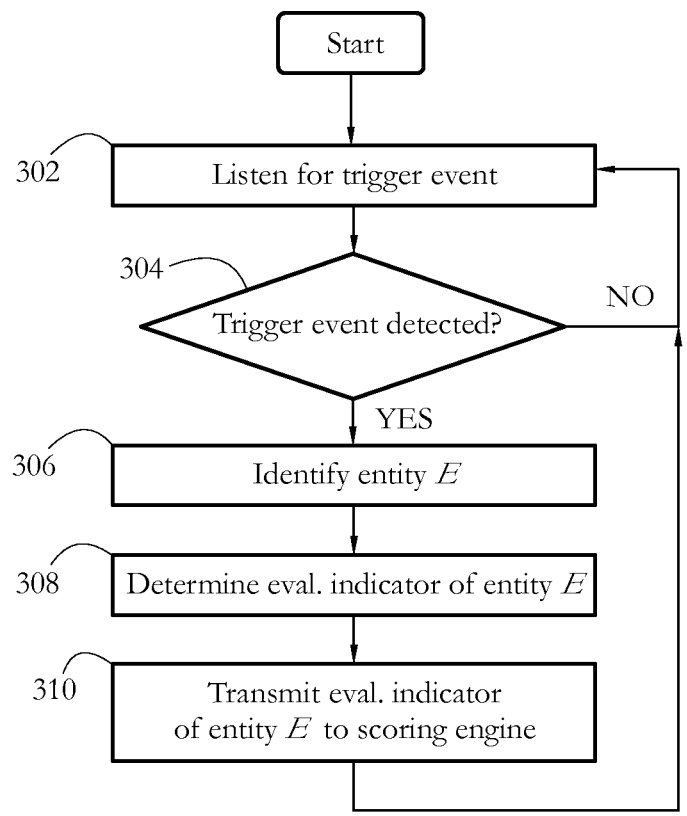
FIG. 7 shows an exemplary sequence of steps performed by an entity evaluator module according to some embodiments of the present invention.

FIG. 7 shows an exemplary sequence of steps performed by an entity evaluator, such as evaluators 50a-c and/or memory introspection engine 40 in FIGS. 4-5, according to some embodiments of the present invention. In a sequence of steps 302-304, the entity evaluator waits for the occurrence of a trigger event within host system 10 and/or virtual machine 32. Exemplary trigger events include, among others, a software entity performing a certain behavior, such as issuing a particular processor instruction, attempting to use a particular piece of hardware such as storage devices 20 or network adapter(s) 22, or attempting to write to a protected memory page. For instance, a trigger event for evaluator 50c may include a software entity issuing a system call (e.g., SYSENTER). Another example of a trigger event for evaluator 50d may include an application calling a function of the UrlDownloadToFile API. To detect the occurrence of a trigger event, the respective entity evaluator may use any method known in the art, such as code injection and MSR hooking, among others. Some examples of trigger event interception are described above, in relation to FIG. 6.

When a trigger event is detected, in a step 306, the entity evaluator may identify the software entity (e.g., process) causing the respective trigger event. In some embodiments, the entity evaluator may determine the identity of the software entity from a data structure used by OS 34 to represent each process and/or thread currently in execution. For instance, in Windows, each process is represented as an executive process block (EPROCESS), which comprises, among others, handles to each of the threads of the respective process, and a unique process ID allowing OS 34 to identify the respective process from a plurality of executing processes. Similar process/thread representations are available for other OSs, such as Linux.

In a step 308, the entity evaluator may formulate an evaluation indicator, including an identifier (e.g., process ID) of the respective software entity and an indicator of the kind of action/event performed by the respective software entity and intercepted in steps 302-304. In some embodiments, the entity evaluator may determine a type of action and/or behavior of the respective software entity, from parameters of the intercepted trigger event. In an example of operation, when a process attempts to download a file from the Internet, user-level entity evaluator 50a may intercept the attempt. Beside identifying which process is performing the action, evaluator 50a may also determine the type of action (downloading a file), the IP address that the file is downloaded from, and the disk location of the downloaded file, among others. Such data may be selectively incorporated into the evaluation indicator, allowing scoring engine 38 to determine that entity X has performed action Y, with parameters Z. In a step 310, the entity evaluator transmits the evaluation indicator to scoring engine 38.

Figure 8:
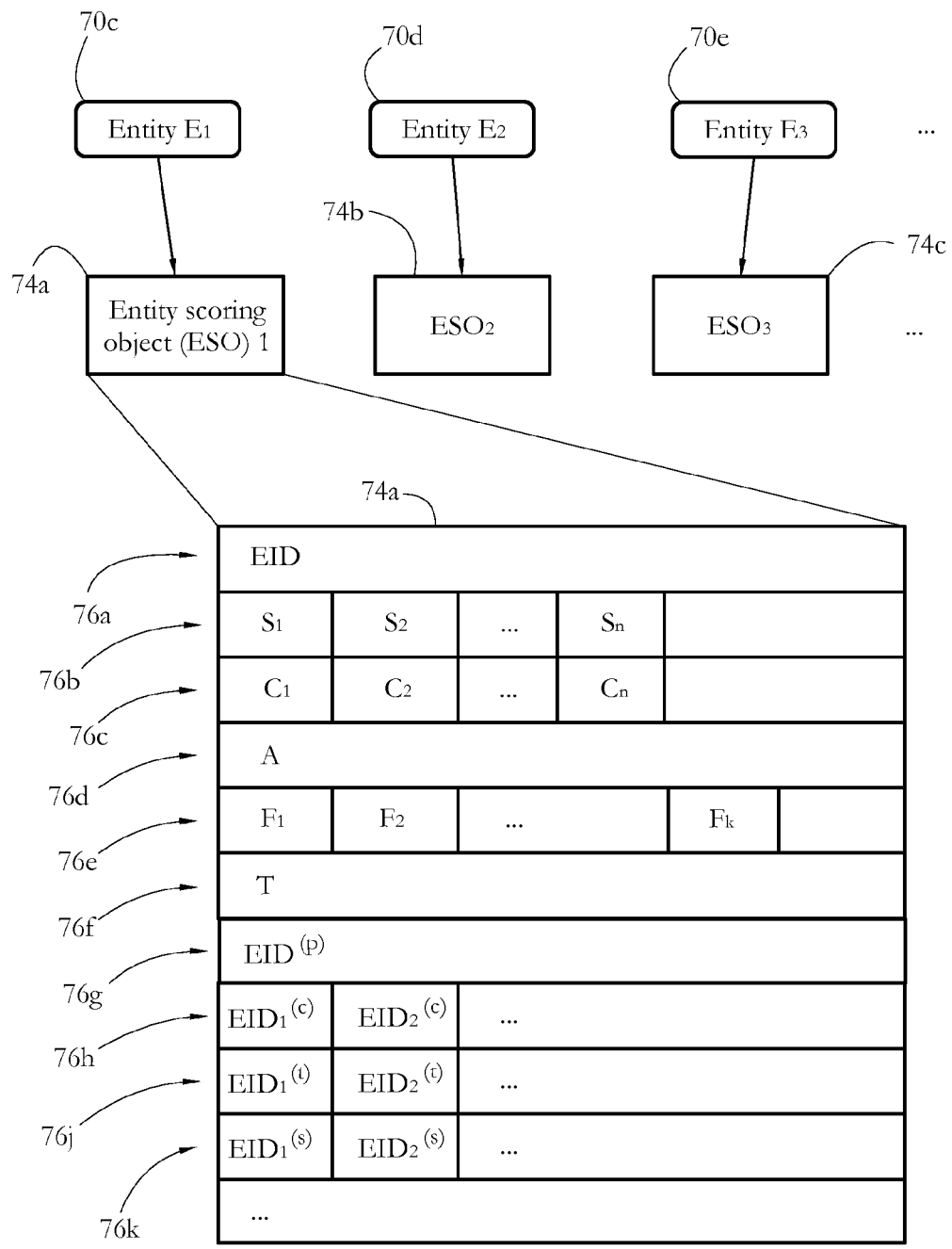
FIG. 8 shows a plurality of exemplary entity scoring objects (ESO), each ESO determined for a respective software entity according to some embodiments of the present invention. Exemplary data fields of an ESO include an entity identity indicator EID, a plurality of scores $S_i$, and an aggregate score A determined for the respective entity, among others.

In some embodiments, scoring engine 38 and/or entity management module 37 maintain a centralized knowledge-base of evaluated software entities, such as processes and threads executing on host system 10 (or VM 32). FIG. 8 shows a set of evaluated entities 70c-e, each represented as an exemplary entity scoring object (ESO) 74a-c, respectively. Each ESO comprises a plurality of data fields, some of which are illustrated in FIG. 8. Such fields may include a unique entity identifier (EID) 76a, a plurality of evaluation scores 76b, and an aggregate score 76d. In some embodiments, evaluation scores 76b are determined by engine 38 according to evaluation indicators 52a-d received from individual entity evaluators. Each such score may be determined according to an evaluation criterion, identified by indicators 76c. In some embodiments, evaluation scores 76b have a one-to-one correspondence with evaluation criteria 76c, so that each score is attributed according to the respective criterion. For instance, a particular criterion $C_k$ may comprise determining whether the evaluated entity downloads a file from a computer network such as the Internet. In one such example, the respective score $S_k$ may be awarded only if the evaluated entity attempts a download.

In some embodiments, ESO 74a may further comprise a set of flags 76e. Some flags 76e may be binary indicators (e.g., 0/1, yes/no). In one such example, a flag indicates whether the respective evaluated entity $E_1$ satisfies a particular evaluation criterion (e.g., whether $E_1$ is an executable file downloaded from the Internet, whether $E_1$ runs in command line mode, etc.). Another exemplary flag is indicative of a classification of entity $E_1$, e.g., an indicator that $E_1$ belongs to a particular category of objects, such as Trojan malware, browser objects, PDF reader applications, etc. An exemplary use of flags comprises a situation wherein an update of an evaluation score $S_i$ of entity $E_1$ triggers an update of another evaluation score $S_j$ of $E_1$ (see below). Flags may be used to turn such co-update mechanisms on and off. For instance, it may be known that when $E_1$ satisfies evaluation criterion $C_i$ (e.g., if the entity performs a particular action), entity $E_1$ is also likely to satisfy criterion $C_j$. Therefore, a flag $F_1$ indicating the connection $<C_i,C_j>$ may be set for entity $E_1$, triggering an update of score $S_j$ when score $S_i$ is updated.

ESO 74a may further include a termination indicator 76f, indicating whether the respective entity is currently active or terminated. Such termination indicators may allow scoring engine 38 to keep records of and/or update scores of terminated entities. ESO 74a may further include a set of identifiers of software entities related to the respective entity $E_1$. Examples of such related software entities may comprise a parent entity of $E_1$, denoted by identifier 76g, and a set of children entities of $E_1$, denoted by identifier 76h. ESO 74a may further comprise a set of indicators of injection target entities (items 76j), identifying software entities into which $E_1$ has injected code, and further a set of indicators of injection source entities (items 76k), identifying software entities which have injected code into $E_1$.

Figure 9:
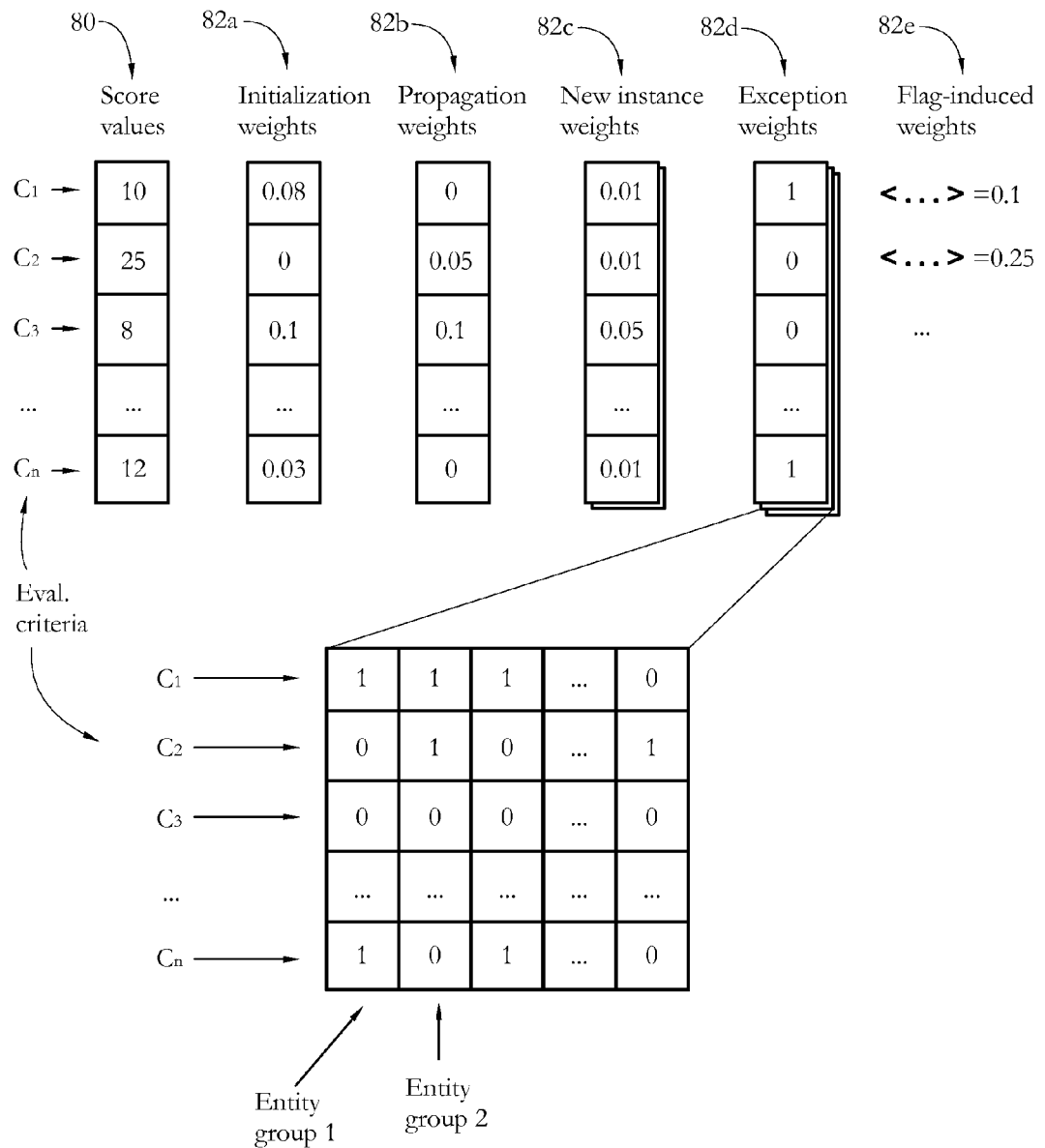
FIG. 9 illustrates an exemplary set of score values, and various exemplary sets of weights used by the scoring engine to score software entities according to some embodiments of the present invention.

In some embodiments, scoring of evaluated software entities proceeds according to a set of score values and further according to additional parameters. FIG. 9 illustrates such data, wherein a set of score values is denoted by item 80. Score values are indexed by their corresponding evaluation criteria $C_1, \ldots C_n$. Each such value may represent, for instance, a predetermined number of points that an evaluated entity receives if it satisfies the respective evaluation criterion (e.g., if it downloads a file from the Internet, if it writes to a MS Word® document, etc.).

Exemplary parameters controlling scoring include a set of initialization weights 82a, a set of propagation weights 82b, a set of new instance weights 82c, a set of exception weights 82d, and a set of flag-induced weights 82e. Weights 82a-e are indexed by the evaluation criteria $C_1, \ldots C_n$. Some type of weights are in a one-to-one correspondence with evaluation criteria, so that there is one weight value $w_i$ for each $C_i$. Other types of weights are in a one-to-many correspondence with evaluation criteria. One such example is exception weights 82d in FIG. 9, wherein there may be a plurality of weights $w_{ij}$ corresponding to a particular evaluation criterion $C_i$. Weights may be grouped by classes or categories of entities, as illustrated by the example of FIG. 9; for instance, there may be a first weight value applicable to word processing applications (e.g., MS Word®), a second weight value (possibly distinct from the first) applicable to web browsers (e.g., Firefox® and MS Internet Explorer®), and a third weight value applicable to file manager applications (e.g., Windows Explorer®). Distinguishing among different categories of entities may be useful, since some evaluation criteria may be more malware-indicative for one category of entities than for others. More generally, each scoring weight may be indexed by a tuple $<C_i,E_k, \ldots >$, wherein $C_i$ denotes a particular evaluation criterion, and wherein $E_k$ denotes a particular evaluated entity. The actual data format for storing and accessing scoring weights 82a-e may vary among embodiments. Weights 82a-e may be stored as matrices, lists, relational databases (RDB), or extensible markup language (XML) structures, among others. An exemplary use of weights for scoring will be discussed below.

Score values 80 and/or weights 82a-e are predetermined, for instance by a human operator. In some embodiments, such values may change in time, and may be adjusted to optimize malware detection. Updated score values and/or weight values may be delivered to host system 10 as periodic and/or on-demand software updates from a security server (see below, in relation to FIGS. 10-11).

Figure 10:
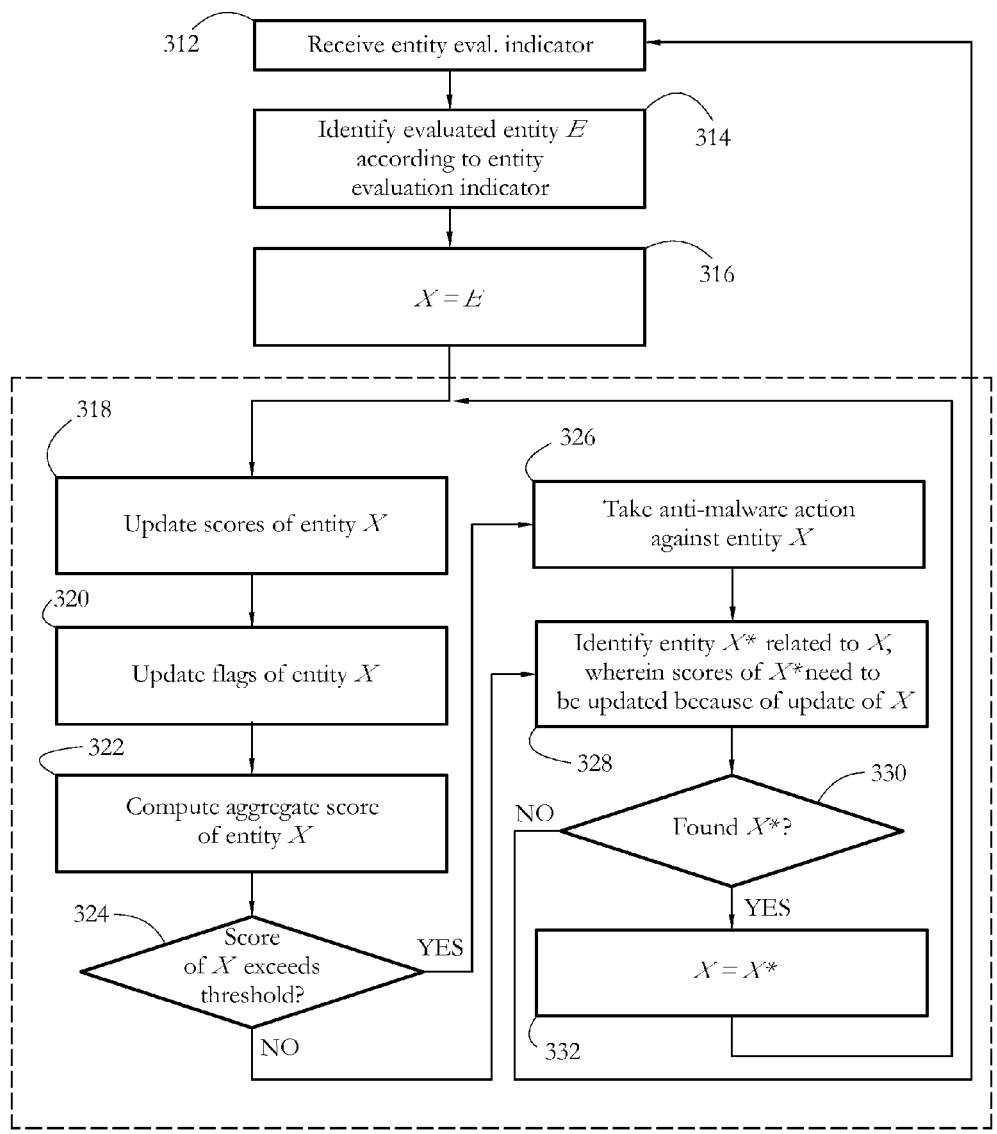
FIG. 10 shows an exemplary sequence of steps performed by the scoring engine (FIGS. 3-4) according to some embodiments of the present invention.

FIG. 10 shows an exemplary sequence of steps executed by scoring engine 38 according to some embodiments of the present invention. In a step 302, engine 38 receives an entity evaluation indicator from an entity evaluator, for instance one of evaluators 50a-c in FIG. 5. In some embodiments implementing hardware virtualization, engine 38 may receive the respective entity evaluation indicator from a component executing outside of the respective virtual machine (e.g., memory introspection engine 40 in FIG. 5). In a step 304, engine 38 may identify the software entity for which the respective entity evaluation indicator was determined, e.g., according to an entity ID embedded in the respective evaluation indicator (see above, in relation to FIG. 7).

Next, scoring engine 38 performs a block of steps 318-332, for the entity E identified in step 304, as well as for other entities related to E. Such related entities may include parent and child entities of E, injection target entities into which E has injected code, and injection source entities which have injected code into E, among others. In this manner, each time engine 38 receives an evaluation indicator (indicating, for instance, that entity E has performed a particular action), block 318-332 may execute several times, updating not only the evaluation scores of entity E, but also the evaluation scores of entities related to E. In some embodiments, block 318-332 is executed once for E and once for each entity E* related to E. In alternative embodiments, block 318-332 is executed recursively, until some convergence criterion is satisfied. An exemplary convergence criterion comprises verifying whether evaluation scores of E and/or E* change between successive executions of block 318-332, and exiting when there is no such change. In the exemplary algorithm of FIG. 10, the variable X is used to indicate the entity currently undergoing score updates. In a step 316, X is set to the entity E identified in step 304.

In a step 318, engine 38 updates evaluation scores of entity X (e.g., entities 76b in FIG. 8). In some embodiments, updating an evaluation score comprises replacing a recorded value of the respective evaluation score with a new value:

$$S_k^{(X)} \to S_k^{(X)} + \Delta S_k, \qquad [1]$$

wherein $S_k^{(X)}$ denotes the evaluation score determined for entity X according to evaluation criterion $C_k$, and wherein $\Delta S_k$ denotes an increment, which may be positive or negative (in some embodiments, evaluation scores may decrease upon update).

In some embodiments, the score increment $\Delta S_k$ is determined by scoring engine 38 according to the evaluation indicator received in step 312. The respective indicator may include a score and/or indicate an evaluation criterion used in determining the respective indicator. In some embodiments, scoring engine 38 determines the score increment $\Delta S_k$ according to score value 80 corresponding to the respective evaluation criterion $C_k$ (see FIG. 9), for instance:

$$\Delta S_k = V_k \quad [2]$$

wherein $V_k$ denotes score value 80 assigned to criterion $C_k$. In one such example, wherein criterion $C_k$ comprises determining whether entity X downloads an object from the network, and wherein $V_k$=20, the evaluation score $S_k^{(X)}$ will be increased by 20 points every time entity X performs a download. In some embodiments, $\Delta S_k = \epsilon V_k$, wherein $\epsilon$ is a binary exception weight (see e.g. items 82d in FIG. 9), forcing score $S_k$ to be updated only for a subset of evaluated entities. Such exception weights are useful, for example to distinguish between various types of evaluated entities. For instance, a browser should be allowed to access an unlimited number of IP addresses without rising suspicion of malware; an evaluation criterion including detecting Internet access may effectively be switched off for browser objects by setting the exception weight to 0 for entities of the browser type, while keeping it active (e=1) for other types of entities.

In some embodiments, the score increment $\Delta S_k$ used in updating the evaluation score of entity X is determined according to an evaluation score determined for an entity X* related to X, i.e., scores may propagate from one entity to a related entity, such as from a child to a parent, or from an injection target to the source of the injection. In one such example, an action performed by a child process may trigger an update not only of a score of the entity performing the action (the child process), but also of a score of the parent process of the respective child process. Such score updates may comprise computing the score increment according to:

$$\Delta S_k = w_k S_k^{(X^*)}, \quad [3]$$

wherein $w_k$ denotes a numerical, criterion-specific weight, indicating a strength with which the score of entity X* affects the score of entity X. Weights $w_k$ may include propagation weights 82b (FIG. 9). Some embodiments distinguish among a variety of such propagation weights, for instance weights used to propagate scores from a child entity to a parent entity may differ in value from weights used to propagate scores from the parent entity to the child entity. Similarly, weights used to propagate scores from the child entity to the parent entity may differ in value from weights used to propagate scores from an entity targeted for code injection to the entity performing the code injection. In some embodiments, scores may propagate from active entities to terminated entities. For instance, an action of a child process may increment the score of the parent process, even when the parent process is terminated.

In some embodiments, entity X* in Eqn. [3] is another instance of entity X. For example, X and X* may be copies of the same process or thread, executing concurrently. In such cases, weight $w_k$ may be a new instance weight (e.g., item 82c in FIG. 9), or an initialization weight (e.g., item 82a). In some embodiments, when a new instance X' of the entity X is launched, engine 38 may update some or all evaluation scores of the existing entity X, using new instance weights $w_k$ to propagate scores from X to X'. Similarly, when X' is launched, engine 38 may update some or all evaluation scores of X', using initialization weights $w_k$ propagate scores from the already executing entity X to the new entity X'.

In some embodiments, updating an evaluation score $S_k$ may trigger an update of a distinct evaluation score $S_m$ of the respective entity. For instance, $$S_k^{(X)} \to S_k^{(X)} + V_k \text{ triggers } S_m^{(X)} \to S_m^{(X)} + F^{(X)} f_{km} V_m, \quad [4]$$

wherein $F^{(X)}$ is a flag set for entity X (see e.g., items 76e in FIG. 8), the flag indicative of a connection between evaluation criteria $C_k$ and $C_m$, and wherein $f_{km}$ is a flag-induced weight (see e.g., item 82e in FIG. 9), indicating a strength with which the update of $S_k$ influences the update of $S_m$ of entity X.

In a step 320, scoring engine 38 may update flags of entity X (see discussion on flags above, in relation to FIG. 8), according to the evaluation indicator received in step 312. Flags may be set to activate and/or de-activate score co-updating mechanisms, such as described above, in relation to Eq. [4]. In one such example, an evaluated entity might be identified as being a web browser application according to the evaluation indicator (step 312); such identification should indicate to scoring engine 38 not to score the respective entity for future downloads from the Internet. This may be achieved by setting the value of a specific flag F to 0 for the respective entity, wherein flag F indicates to scoring engine 38 to update an evaluation score of the respective entity, when the entity downloads an object from the Internet.

In a step 322, scoring engine 38 may determine an aggregate score of entity X by combining individual evaluation scores determined for the respective process, for instance as a sum:

$$A^{(X)} = \sum_k S_k^{(X)} \quad [5]$$

In a step 324, engine 38 may compare the aggregate score to a predetermined threshold. When the aggregate score does not exceed the threshold, scoring engine 38 may proceed to a step 326 described below. In some embodiments, the threshold may be set to a value determined according to a user input. Such threshold values may reflect the respective user's security preferences. For instance, when the user opts for tight security, the threshold may be set to a relatively low value; when the user prefers a more tolerant security setting, the threshold may be set to a relatively high value. In some embodiments, the threshold value may be received from a remote security server, as described below in relation to FIGS. 10-11.

In some embodiments, in steps 322-324, scoring engine 38 may determine a plurality of aggregate scores, and compare each aggregate score to a (possibly distinct) threshold. Each such aggregate score may be determined according to a distinct subset of evaluation scores. In an exemplary embodiment, each such subset of scores, and their corresponding subset of evaluation criteria, may represent a particular class or type of malware (e.g., Trojans, rootkits, etc.). This may allow engine 38 to perform a classification of the detected malware. In another embodiment, scoring engine 38 employs a plurality of threshold values in order to classify the execution entities according to various degrees of maliciousness (e.g. clean, suspicious, dangerous and critical).

When the aggregate score exceeds the threshold, in a step 326, engine 38 may decide that the evaluated process is malicious, and may take anti-malware action. In some embodiments, such anti-malware action may include, among others, terminating the evaluated process, quarantining the evaluated process, and removing or disabling a resource (such as a file or a section of memory) of the evaluated process. In some embodiments, anti-malware action may further comprise alerting a user of host system 10, and/or alerting a system administrator, for instance by sending a message to the system administrator over a computer network connected to host system 10 via network adapter(s) 22. In some embodiments, anti-malware action may also comprise sending a security report to a remote security server, as described below in relation to FIGS. 10-11.

In a sequence of steps 328-330, engine 38 may identify an entity X* related to X, wherein scores of X* need updating following the current score updates of X. For instance, X* may be a parent or a child entity of X. In some embodiments, entities X* may be identified according to fields 76g-k of the ESO of entity X (see, e.g., FIG. 8). When no such entities X* exist, or when all such entities X* have already been considered for score updates, engine 38 returns to step 312. When there is at least an entity X*, in a step 332 scoring engine makes X* the current entity and returns to step 318.

The exemplary scoring engine 38 depicted in FIGS. 3-4 operates within VM 32 at OS processor privilege level (e.g., kernel mode). In alternative embodiments, scoring engine 38 may execute within VM 32 in user mode, or even outside VM 32, at the processor privilege level of hypervisor 30.

In some embodiments, introspection engine 40 executes substantially at the same privilege level as hypervisor 30, and is configured to perform introspection of virtual machines such as VM 32 (FIG. 3). Introspection of a VM, or of a software entity executing on the respective VM, may comprise analyzing a behavior of the software entity, determining and/or accessing memory addresses of such entities, restricting access of certain processes to a content of memory located at such addresses, analyzing such content, and determining evaluation indicators of the respective entities (e.g., indicator 52d in FIG. 5), among others.

Figure 11:
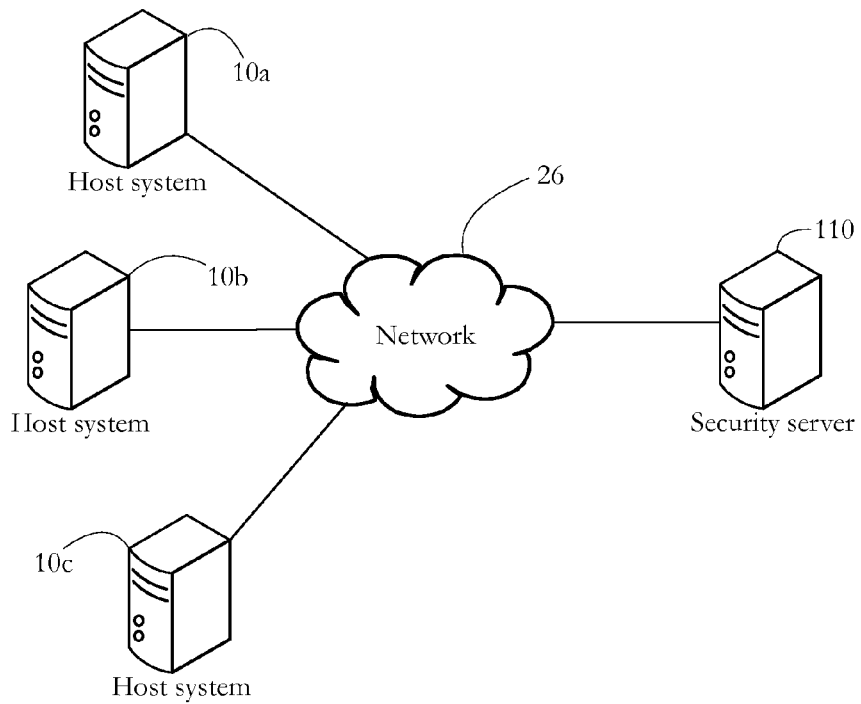
FIG. 11 illustrates an exemplary configuration comprising a plurality of host systems connected to a security server via a computer network.

In some embodiments, host system 10 may be configured to exchange security information, such as details about malware detection events, with a remote security server. FIG. 11 illustrates such an exemplary configuration, in which a plurality of host systems 10a-c, such as system 10 discussed above, are connected to a security server 110 via a computer network 26. In an exemplary embodiment, host systems 10a-c are individual computers used by employees of a corporation, while security server 110 may comprise a computer system configured by a network administrator of the respective corporation to monitor malware threats or security events occurring on systems 10a-c. In another embodiment, for instance in an Infrastructure-as-a-service (IAAS) system wherein each host system 10a-c is a server hosting tens or hundreds of virtual machines, security server 110 may comprise a computer system configured to manage anti-malware operations for all such VMs from a central location. In yet another embodiment, security server 110 may comprise a computer system configured by a provider of anti-malware software (e.g., the provider of security application 44, among others), to receive statistical and/or behavioral data about malware detected on various systems around network 26. Network 26 may include a wide-area network such as the Internet, while parts of network 26 may include local area networks (LAN).

Figure 12:
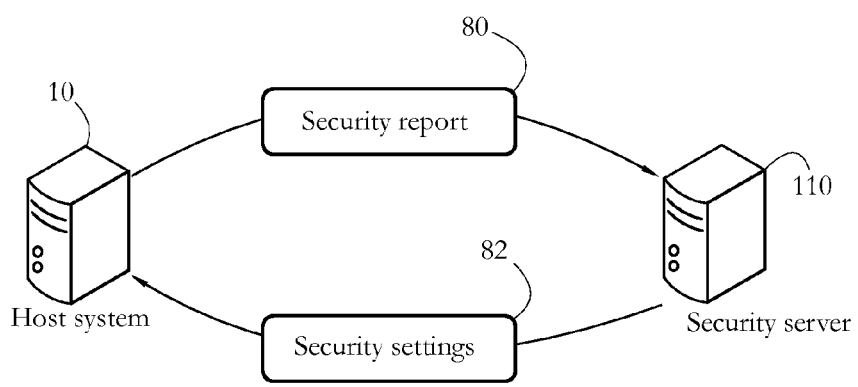
FIG. 12 shows an exemplary anti-malware transaction between a host system and a security server according to some embodiments of the present invention.

FIG. 12 shows an exemplary data exchange between host system 10 and security server 110 in an embodiment as shown in FIG. 11. Host system 10 may be configured to send a security report 80 to server 110, and to receive a set of security settings 82 from server 110. In some embodiments, security report 80 comprises entity evaluation indicators 52a-d and/or scores determined by entity evaluators 50a-c and/or 40, executing on host system 10, and/or aggregate scores determined by scoring engine 38, among others. Security report 80 may also comprise data identifying the respective system 10 and evaluated entities (e.g., entity IDs, names, paths, hashes, or other kinds of entity identifiers), as well as indicators associating an entity evaluation indicator/score to the host system and entity for which it was determined. In some embodiments, report 80 may further comprise statistical and/or behavioral data regarding entities executing on host system 10. System 10 may be configured to send report 80 upon detection of malware, and/or according to a schedule (e.g., every few minutes, every hour, etc.).

In some embodiments, security settings 82 may include operational parameters of entity evaluators (e.g., parameters of filters 50a-c in FIG. 5), and/or parameters of scoring engine 38. Exemplary parameters of engine 38 include the threshold for deciding whether an evaluated process is malicious, as well as score values 80 and weights 82a-e, among others.

In some embodiments, server 110 runs an optimization algorithm to dynamically adjust such parameters to maximize malware-detection performance, for instance to increase detection rate while minimizing false positives. Optimization algorithms may receive statistical and/or behavioral data about various entities executing on the plurality of host systems 10a-c, including entity evaluation indicators/scores reported to scoring engine 38 by various entity evaluators, and determine optimal values for the parameters. The values are then transmitted to the respective host systems via network 26.

In one such example of optimization, changing score values 80 may effectively change the relevance of the respective evaluation criteria, relative to each other. Malware threats typically occur in waves, in which a great number of computer systems worldwide are affected by the same malware agent in a short time interval. By receiving security reports 80 in real time from a plurality of host systems, security server 110 may be kept up to date with the current malware threats, and may promptly deliver optimal security settings 82 to the respective host systems, settings 82 including, for instance, a set of score values 80 optimized for detecting the current malware threats.

The exemplary systems and methods described above allow protecting a host system, such as a computer system, from malware such as viruses, Trojans, and spyware. For each of a plurality of executable entities, such as processes and threads currently executing on the host system, a scoring engine records a plurality of evaluation scores, each score determined according to a distinct evaluation criterion. In some embodiments, evaluated software entities may vary substantially in scope and complexity, for instance from individual execution threads, to individual applications, to whole instances of operating systems and/or virtual machines.

Every time a monitored entity satisfies an evaluation criterion (e.g, performs an action), the respective score of the entity is updated. Updating a score of a target entity may trigger score updates of other entities related to the target entity. Such related entities include, among others, children of the target entity, the parent of the target entity, entities into which the target entity has injected code, and entities which have injected code into the target entity.

Conventional anti-malware systems typically score each entity separately from other entities. Some malware may try to evade detection by dividing malicious activities among several distinct agents, such as children processes of a malicious process, so that none of the individual agents performs sufficient malware-indicative activity to be detected. In contrast, some embodiments of the present invention propagate scores from one entity to other related entities, thus corroborating malware-indicative data across related entities. Score propagation may ensure that at least one of the agents involved in malicious activities is detected.

In one exemplary evasion strategy, a malware agent may spawn a plurality of child processes and quit. Malicious activities may be divided among child processes, such that the actions of no individual child may trigger a malware alarm on their own. In some embodiments of the present invention, scores may propagate from one entity to another, even when the latter is terminated. Such a configuration may detect the parent process as malicious, even if it may fail to detect maliciousness of the child processes. Some embodiments maintain a list of entities currently under evaluation; the list may include both active and terminated entities. An entity may be taken off the list only when all descendants of the respective entity are terminated.

In conventional anti-malware systems, only one score is typically recorded for each entity. By keeping a plurality of per-entity scores, each computed according to its distinct criterion, some embodiments of the present invention allow scores to be propagated among related entities on a per-criterion basis. Such scores may either increase or decrease upon propagation, allowing a more precise assessment of maliciousness throughout the life cycle of each entity, with fewer false positive detections. In some embodiments, the extent to which scores of one entity affect scores of a related entity is adjustable via a numerical propagation weight. Such weights may differ from one entity to another and/or from one evaluation criterion to another, allowing a flexible and precise tuning of score propagation. Weight values may be determined by human operators and/or be subject to automated optimization aimed at improving malware detection performance.

Some conventional anti-malware systems determine whether an evaluated entity is malicious by determining whether the respective entity performs a malware-indicative behavior, and/or whether the entity has malware-indicative features, such as a malware-indicative sequence of code. In contrast, in some embodiments of the present invention, entity evaluation criteria are not necessarily malware-indicative on their own. For instance, some criteria include determining whether an entity performs benign actions such as opening a file or accessing an IP address. Nevertheless, such actions may be malicious when combined with other actions, which themselves may not be malware-indicative on their own. By monitoring a wide variety of entity behaviors and/or features, subsequently recording a large number (possibly hundreds) of evaluation scores, and aggregating such scores in a per-entity fashion, some embodiments of the present invention may increase detection rates, while minimizing false positives.

Some embodiments of the present invention may protect a virtualized environment. In an embodiment configured to support virtualization, some components of the present invention may execute within a virtual machine, whereas others may execute outside the respective virtual machine, for instance at the level of a hypervisor exposing the respective virtual machine. Such components executing at hypervisor level may be configured to perform anti-malware operations for a plurality of virtual machines executing concurrently on the respective host system.

It will be clear to one skilled in the art that the above embodiments may be altered in many ways without departing from the scope of the invention. Accordingly, the scope of the invention should be determined by the following claims and their legal equivalents.

What is claimed is:

1. A host system comprising a memory unit storing instructions which, when executed by at least one hardware processor of the host system, cause the host system to form an entity management module, an entity evaluator, and a scoring engine, wherein:
   the entity management module is configured to manage a collection of evaluated software entities, wherein managing the collection comprises:
      identifying a set of descendant entities of a first entity of the collection;
      determining whether the first entity is terminated;
      in response, when the first entity is terminated, determining whether all members of the set of descendant entities are terminated; and
      in response, when all members of the set of descendant entities are terminated, removing the first entity from the collection;
   the entity evaluator is configured to:
      evaluate the first entity according to an evaluation criterion; and
      in response, when the first entity satisfies the evaluation criterion, transmit an evaluation indicator to the scoring engine; and
   the scoring engine is configured to:
      record a first score determined for the first entity and a second score determined for a second entity of the collection, the first and second scores determined according to the evaluation criterion;
      in response to recording the first and second scores, and in response to receiving the evaluation indicator, update the second score according to the evaluation indicator;
      in response, determine whether the second entity is malicious according to the updated second score;
      in response to receiving the evaluation indicator, update the first score according to the evaluation indicator; and
      in response, determine whether the first entity is malicious according to the updated first score.

2. The host system of claim 1, wherein the first entity is a child of the second entity.

3. The host system of claim 1, wherein the second entity is a child of the first entity.

4. The host system of claim 1, wherein the first entity comprises a section of code injected by the second entity.

5. The host system of claim 1, wherein the second entity comprises a section of code injected by the first entity.

6. The host system of claim 1, wherein updating the second score comprises changing the second score by an amount determined according to w•S, wherein S is the first score, and wherein w is a numerical weight.

7. The host system of claim 1, wherein managing the collection of evaluated software entities further comprises:
   intercepting a launch of a new software entity; and
   in response, adding the new software entity to the collection.

8. A non-transitory computer-readable medium storing instructions, which, when executed, configure at least one processor of a host system to:
   manage a collection of evaluated software entities, wherein managing the collection comprises:
      identifying a set of descendant entities of a first entity of the collection;
      determining whether the first entity is terminated;

in response, when the first entity is terminated, determining whether all members of the set of descendant entities are terminated; and in response, when all members of the set of descendant entities are terminated, removing the first entity from the collection;

record a first score determined for the first entity and a second score determined for a second entity of the collection, the first and second scores determined according to an evaluation criterion;

in response to recording the first and second scores, evaluate the first entity according to the evaluation criterion;

in response to evaluating the first entity, when the first entity satisfies the evaluation criterion, update the second score;

in response to updating the second score, determine whether the second entity is malicious according to the updated second score;

in response to evaluating the first entity, when the first entity satisfies the evaluation criterion, update the first score; and in response, determine whether the first entity is malicious according to the updated first score.

9. The computer-readable medium of claim 8, wherein the first entity is a child of the second entity.

10. The computer-readable medium of claim 8, wherein the second entity is a child of the first entity.

11. The computer-readable medium of claim 8, wherein the first entity comprises a section of code injected by the second entity.

12. The computer-readable medium of claim 8, wherein the second entity comprises a section of code injected by the first entity.

13. The computer-readable medium of claim 8, wherein updating the second score comprises changing the second score by an amount determined according to $w \cdot S$, wherein S is the first score, and wherein w is a numerical weight.

14. The computer-readable medium of claim 8, wherein managing the collection of evaluated software entities further comprises:
intercepting a launch of a new software entity; and
in response, adding the new software entity to the collection.

15. A method comprising employing at least one processor of a host system to:
manage a collection of evaluated software entities, wherein managing the collection comprises:
identifying a set of descendant entities of a first entity of the collection;
determining whether the first entity is terminated;
in response, when the first entity is terminated, determining whether all members of the set of descendant entities are terminated; and
in response, when all members of the set of descendant entities are terminated, removing the first entity from the collection;
record a first score determined for the first entity and a second score determined for a second entity of the collection, the first and second scores determined according to an evaluation criterion;
in response to recording the first and second scores, evaluate the first entity according to the evaluation criterion;
in response to evaluating the first entity, when the first entity satisfies the evaluation criterion, update the second score;
in response to updating the second score, determine whether the second entity is malicious according to the updated second score;
in response to evaluating the first entity, when the first entity satisfies the evaluation criterion, update the first score; and
in response, determine whether the first executable entity is malicious according to the updated first score.

* * * * *